I. C. DAKIN.
GRAIN AND FOOD COOKER.
APPLICATION FILED NOV. 26, 1917.
1,339,323.
Patented May 4, 1920.
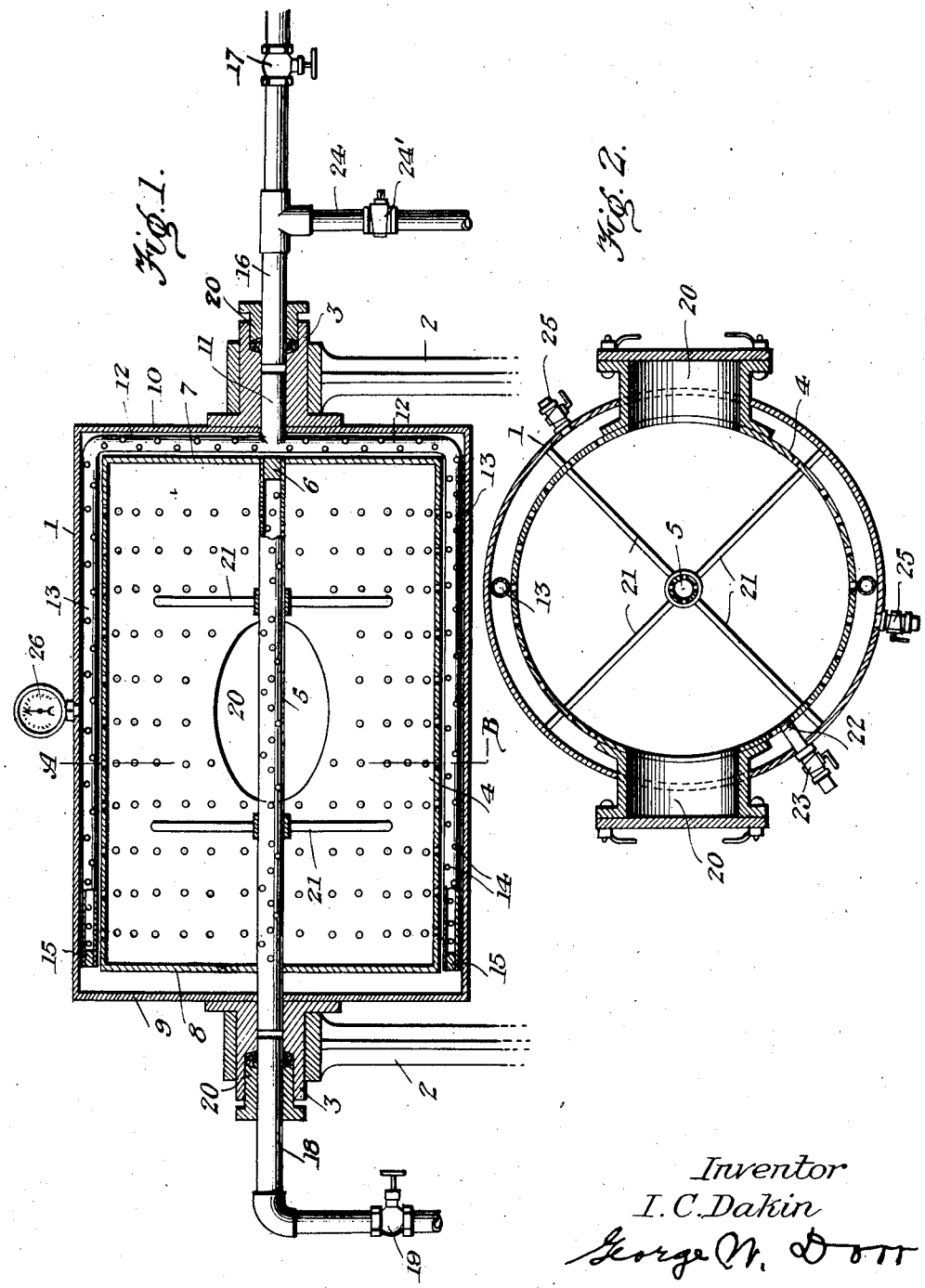
Inventor
I. C. Dakin
George W. Dorr
Attorney.

UNITED STATES PATENT OFFICE.

ISAAC C. DAKIN, OF OWOSSO, MICHIGAN.

GRAIN AND FOOD COOKER.

1,339,323.    Specification of Letters Patent.    Patented May 4, 1920.

Application filed November 26, 1917. Serial No. 203,977.

*To all whom it may concern:*

Be it known that I, ISAAC C. DAKIN, a citizen of the United States, residing at Owosso, in the county of Shiawassee and State of Michigan, have invented a new and useful Grain and Food Cooker, of which the following is a specification.

This invention relates to certain new and useful improvements in a grain and food cooker used in most instances for cooking grain for the manufacture of breakfast foods and the like, although it is very desirable for use in cooking grain for any other purpose.

The main object of the present invention resides in the fact that a cooker constructed and arranged according to the idea submitted accomplishes the ultimate result of properly conditioning the grain in a more thorough, even and economical manner.

Another object of the invention resides in the combination of the parts in which the cycle of operation can be reversed and on being reversed acts as a cleaning medium for the cooker.

With these and other objects in view as will be apparent to those skilled in the art I will now specifically describe my invention which should be read in conjunction with the attached drawings.

In the drawings Figure 1 is a longitudinal sectional view of the entire apparatus with its pipe connections and Fig. 2 is a cross section taken on line A B Fig. 1.

Similar letters of reference indicate like parts throughout the several views.

In the accompanying drawings 1 indicates an exterior cylindrical casing which is rotatably supported in standards 2—2 by the bearings 3—3 arranged centrally of the heads of the casing 1, the bearings being hollowed for a purpose hereinafter described. Arranged concentrically within and spaced on all sides from the casing 1 is a foraminated cylinder 4. This cylinder 4 has positioned centrally thereof a perforated pipe 5 which is plugged at one end as illustrated at 6, this end of the pipe is fastened in any suitable manner to the end wall 7 of the foraminated cylinder and the opposite end of the pipe 5 extends through the opposite end wall 8 of the cylinder 4 and also through the end wall 9 of the exterior cylindrical casing 1 and terminates within the hollowed portion of one of the bearings 3. Stay rods 21 are arranged within the cylinders to properly brace them in their spaced relation and may also be connected to the perforated pipe to support the same intermediate its ends. Through the opposite end wall 10 of the casing 1 extends a short section of a pipe 11, this pipe communicates with the space between the casing 1 and the cylinder 4 and is branched off in opposite vertical directions as at 12—12 which terminate in horizontally arranged pipings 13—13. The sections 12—12 and 13—13 of the pipe just described are perforated as indicated at 14 and are sealed at their terminal ends by any suitable means such as plugs 15—15. The pipe 11 terminates within the hollowed portion of one of the bearings 3.

Into the bearing member which contains the pipe 11 extends an inlet pipe 16 which is provided with a valve 17 by which the amount of steam admitted may be regulated, while into the opposite bearing there extends an outlet pipe 18 which is provided with a regulating valve 19. Suitable stuffing boxes 20—20 are arranged on the inlet and outlet pipes where they enter into the bearings to prevent the escape of steam.

Access to the inner cylinder is had through the opening 20' which is closed by any screw bolts 27; if desired more than one of these charging openings may be provided.

Communication may be had, during the cooking operation, to the interior foraminated cylinder in order to test the material therein to determine whether or not the grain is cooked to the proper degree through the vent 22 in which there is a cut off valve 23.

In order that the cooker may be easily and thoroughly cleaned there is provided a blow off pipe which when opened usually after a cooking operation allows the trapped steam to travel backward through the machine and carry off with it all sediment and waste matter that might have collected between the two cylinders. To carry out this cycle of operation a blow off pipe 24 is arranged in communication with the inlet pipe 16 between the cooker and the valve 17. This blow off pipe has a regulating valve 24' which may be opened or closed according to the cycle of operation.

It is thought advisable to provide the cylindrical casing 1 with valved pipe sections 25—25 to one of which a hose or water supply pipe may be connected while the other is left open so that the cooker may occasionally be washed or flushed. Any suitable means may be used to give rotation to the cylinders either in the cooking or cleaning operation. Also to this cylinder there is attached a pressure gage 26.

The complete operation of the device is as follows: All valves considered to be closed, the foraminated cylinder is charged with grain and the doors closed, and power applied to give the cylinders the desired rotation. The valve 17 is then opened to admit steam into the perforated pipe sections 12—12 and 13—13 which delivers the steam into the space between the cylinders. This space allows the steam to freely circulate about the foraminated cylinder 4 and finally work its way into the mass of material within the cylinder and enter the centrally arranged perforated pipe 5. When sufficient pressure is attained within the cylinders as will be determined by looking at the pressure gage 26 the outlet valve 19 is opened but not enough to reduce the desired pressure thereby allowing the dead steam to be forced out by the entering live steam. After a sufficient length of time the vent 22 may be opened to allow a small amount of material within the foraminated cylinder 4 to escape in order that it may be examined to see if the operation of cooking is completed. If so, valves 17 and 19 are again closed and the blow off regulating valve 24' opened, this allows the steam to escape back through the cylinders and out at the blow off pipe 24. In its backward course through the cylinders the steam carries with it all sediment and waste material which might have collected into the space between the cylinders due to the agitation of the material within the foraminated cylinder 4. The rotation of the cylinders is then stopped and the cooked material removed, the cooker being ready to receive another batch.

It will therefore be noted that in the construction under consideration after the cooking operation is completed, simply by manipulating the valves the machine may be automatically cleaned which is a great saving in time over the old hand method heretofore employed. Should it be desired to flush or wash the cooker a hose or water supply pipe may be connected to the valved pipe sections 25—25.

While I have illustrated the preferred embodiment of my invention in the accompanying drawings, I wish it understood that certain variations may be resorted to without sacrificing any of the spirit of the invention.

What I claim is:

1. In a rotary steam cooker, the combination of a horizontally arranged outer cylindrical casing, a foraminated cylinder within and spaced from the side and head walls of the outer casing, a steam inlet through the head of the outer cylinder, a pipe in communication with the inlet for delivering steam into various portions of the space between the cylinders, a centrally arranged exhaust pipe extending through the foraminated cylinder and communicating with an outlet and regulating valves for governing the inlet and outlet.

2. In a rotary steam cooker, the combination of a horizontally arranged outer cylindrical casing, a foraminated cylinder within and spaced from the side and head walls of the outer casing, a steam inlet, a pipe having branches therein in communication with the inlet for delivering steam into the space between the heads and sides of the cylinders, an exhaust pipe axially arranged within the foraminated cylinder and communicating with an outlet and regulating valves for governing the inlet and outlet.

3. In a rotary steam cooker, the combination of a horizontally arranged outer cylindrical casing, a foraminated cylinder within and spaced from the side and head walls of the outer casing, a steam inlet, a pipe having perforated branches therein in communication with the inlet for delivering steam into the space between the heads and sides of the cylinders, an exhaust pipe axially arranged within the foraminated cylinder and communicating with an outlet and regulating valves for governing the inlet and outlet.

4. In a rotary steam cooker, the combination of an outer cylindrical casing, a foraminated cylinder within and spaced from the inner walls of the outer casing, a steam inlet, a pipe in communication therewith for delivering steam into the space between the cylinders, a pipe leading from the interior of the foraminated cylinder and communicating with an outlet, regulating valves for governing the inlet and outlet and blow off means associated with the steam delivering pipe to permit a back pressure through the cylinders to clean the same when the inlet and outlet valves are closed.

5. In a rotary steam cooker, the combination of an outer cylindrical casing, a foraminated cylinder within and spaced from the inner walls of the outer casing, a steam inlet, a pipe communicating therewith for delivering steam into the space between the cylinders, a pipe leading from the interior of the foraminated cylinder and communicating with an outlet, regulating valves for governing the inlet and outlet, and a blow off pipe having a valve therein in communication with the steam delivering pipe and adapted when its valve is opened and the inlet and outlet valves closed to allow a back pressure through the cylinders to clean the same.

In testimony whereof I affix my signature in the presence of two witnesses.

ISAAC C. DAKIN.

Witnesses:
 ELLIS F. WILSON,
 MARIA J. WIEDEMAN.